Jan. 22, 1935.　　　　　C. E. JOHNSON　　　　　1,988,738
PROCESS OF MAKING PISTON RINGS
Filed May 25, 1931　　　2 Sheets-Sheet 1

Inventor
Charles E. Johnson
By Livance and Van Antwerp
Attorneys

Jan. 22, 1935.  C. E. JOHNSON  1,988,738
PROCESS OF MAKING PISTON RINGS
Filed May 25, 1931   2 Sheets—Sheet 2

Inventor
Charles E. Johnson
By Liverance and
Van Antwerp
Attorneys

Patented Jan. 22, 1935

1,988,738

UNITED STATES PATENT OFFICE 1,988,738

PROCESS OF MAKING PISTON RINGS

Charles E. Johnson, North Muskegon, Mich.

Application May 25, 1931, Serial No. 539,681

3 Claims. (Cl. 29—156.61)

This invention relates to piston rings and a novel method of producing the same.

The present invention is directed to a practical and simple piston ring construction and a very practical, efficient, simple and economical process of treating the ring castings to produce the finished ring, and provide the requisite tension in the completed piston ring so that, with an expanding ring seated in a piston ring groove within a cylinder, the outer curved surface of the ring bears snugly and with sufficient pressure against the inner walls of the cylinder; while with a contracting ring seated in a groove in the wall of a cylinder around a reciprocating piston or piston rod the inner curved side of the ring bears snugly against the outer cylindrical surface of the piston or piston rod, whereby in both cases an effective seal is made between the piston and the cylinder or rod to obviate the escape of compression or the passage of oil or gases of combustion or steam between the piston and cylinder or between a piston rod and its packing ring.

Piston rings of the so-called hammered type are hard to produce in the matter of uniformity in rings and also uniformity in the circumferential length of a ring which is necessary for the production of a good quality piston ring. The process of hammering rings requires large and expensive equipment particularly because of the very many different sizes of piston rings which are standard and are called for by the makers and users of internal combustion and other engines, pumps and the like. The present invention produces not only piston rings which are of uniform quality throughout but the process may be carried out economically with very simple machinery and with great rapidity.

An understanding of the invention for the attainment of the ends stated may be had from the following description, taken in connection with the accompanying drawings, in which, Fig. 1 is an elevation of a piston ring prior to the completion of the process for making an expanding ring wherein normally, when free to do so, the ends of the finished ring at the parting are separated from each other by a considerable gap.

Like reference characters refer to like parts in the different figures of the drawings.

The piston ring casting 1 is of circular form and is finished at its opposite flat sides and at its outer curved side in the manufacture for an expanding ring with a parting at one side as indicated at 2. The inner curved side of the ring may be finished but it is not necessary in my invention as the scale of the casting may be left on which strengthens the ring and also reduces the cost of manufacture.

Figure 2:
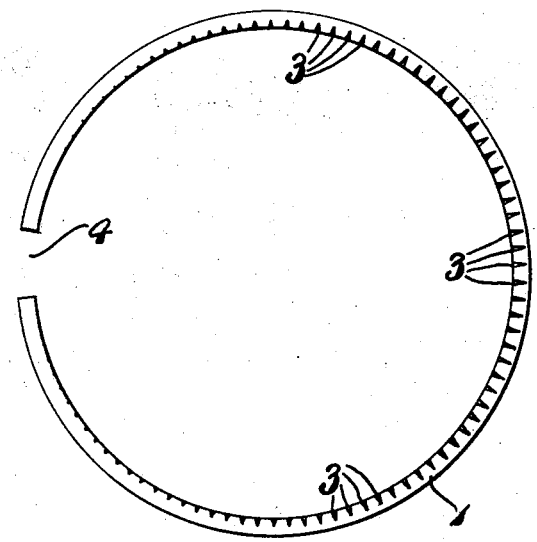
Fig. 2 is a like elevation showing the ring of Fig. 1 after it has been subjected to the process of my invention.
Figure 3:
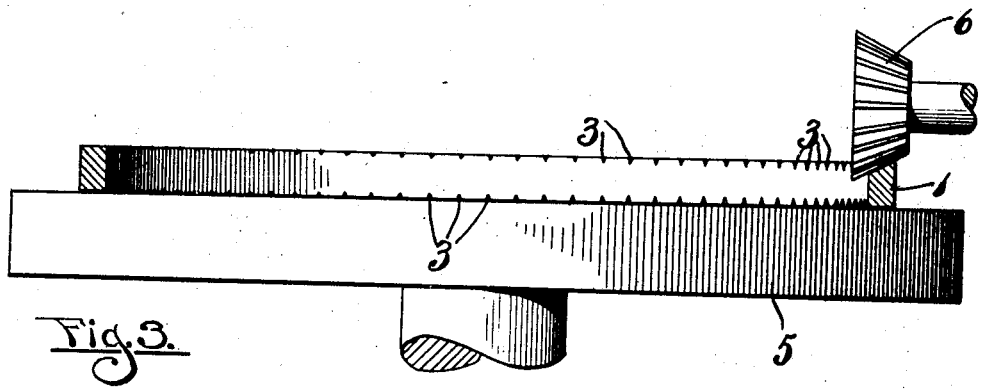
Fig. 3 is an elevation, partly in section, showing the manner in which the ring illustrated in Fig. 1 may be treated to complete the same to produce the piston ring shown in Fig. 2.
Figure 5:
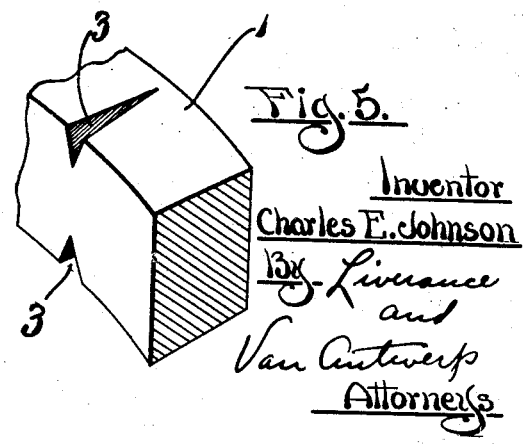
Fig. 5 is a fragmentary enlarged partial perspective and section through the ring, illustrating indentations made in the opposite parallel flat sides of the ring and from the inner curved side of the ring outward to provide an expanding piston ring.

In carrying out my novel process where an expanding ring is to be produced, both the upper and lower flat parallel sides of the ring are preferably indented at closely spaced apart intervals, as indicated at 3, from the inner curved side of the ring outward toward the outer curved side or the upper and lower edges may be rolled with a smooth roller obtaining the same results; the indentations or rolling 3 being deepest at the inner side of the ring and running out and ending before reaching the outer curved side, as best shown in Figs. 3 and 5. In providing these indentations the same are made deepest directly opposite the ring gap and progressively decrease in depth and length toward the gap or parting so that adjacent said parting the indentations run out and disappear as shown in Fig. 2.

Figure 1:
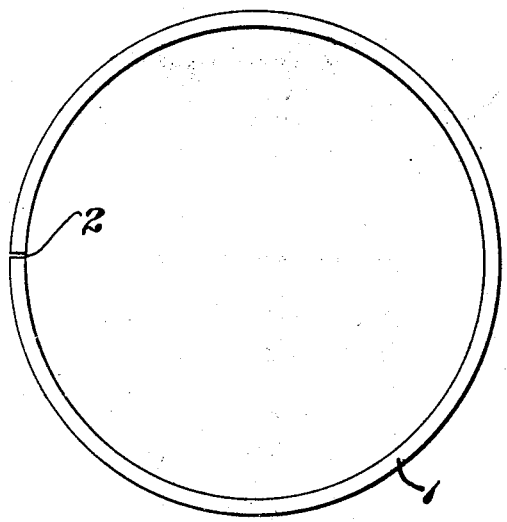

The indenting and upsetting of the metal by the production of the indentations 3 as described presses the metal inward at the inner side of the ring and causes the ring to expand with a deforming of the circular ring shown in Fig. 1 to an out-of-round form, thereby widening and opening the parting at 2 to make an appreciably wide gap as indicated at 4 in Fig. 2; and the extent of the gap width at 4 is dependent upon the depth and number of the indentations 3 made, the gap being narrower with the shallower indentations and wider with the deeper indentations.

In Fig. 3 a simple means of treating the rings to provide the indentations at its opposite flat sides and adjacent to its inner curved side is shown. The table 5 is a table of a well known machine namely, the table of a rotating chuck or anvil which may be driven or rotated at nominal speed. The ring is placed on the anvil and in practice may be located around or within a slightly raised circular projection having the proper exterior or interior diameter that the ring will fit. An indenting rotatable tool 6 or a roller on a suitable shaft is positioned so as to bear against the upper side of the ring 1 whereby with the rotation of the ring and the accompanying rotation of the tool the indentations 3 or a rolled edge at one side of the ring are almost instantly produced.

It is of course to be understood that one side of the rotating table or anvil is slightly higher than the other so when the ring is revolved under the indenting tool 6 the indentations will be deeper opposite the parting and disappear for a short distance where the parting is to be made, the axes of rotation of the table and of the indenting tool 6 are located at an angle to each other. When one side of the ring has been thus treated it is turned over, placed on the table or anvil and the opposite side treated in the same manner.

Figure 4:
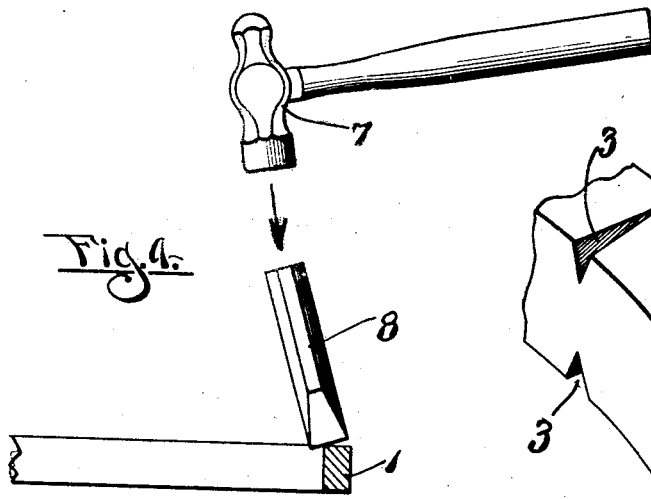
Fig. 4 is a fragmentary elevation partly in section showing another manner of treating the ring to carry out the process.

In Fig. 4 a hand method is disclosed of carrying out the process for the production of the piston ring which consists merely in the use of a hammer 7 and a peening tool 8 which illustrates the peening process instead of rolling, stamping onto dies in a press or indenting by means of a drop hammer.

Figure 6:
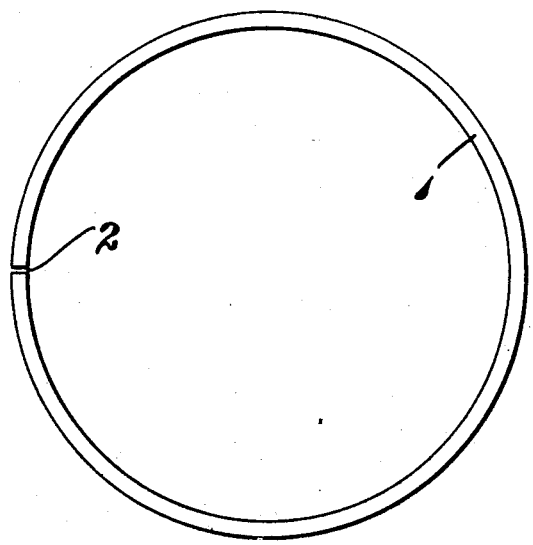
Fig. 6 is a view similar to Fig. 1 showing the piston ring to be treated for the production of a contracting piston ring, utilizing the same process.
Figure 7:
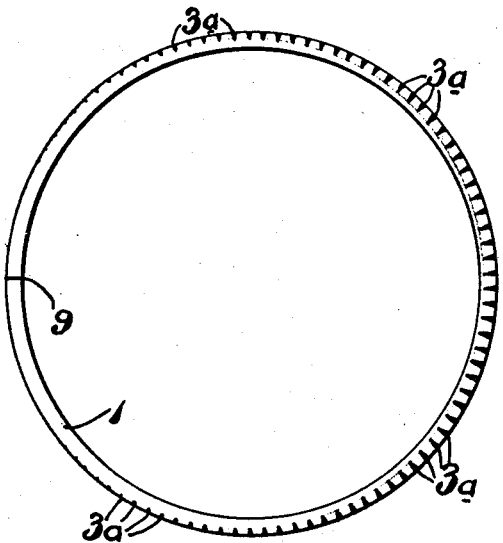
Fig. 7 is an elevation illustrating the complete contracting ring after it has been subjected to the process of my invention.
Figure 8:
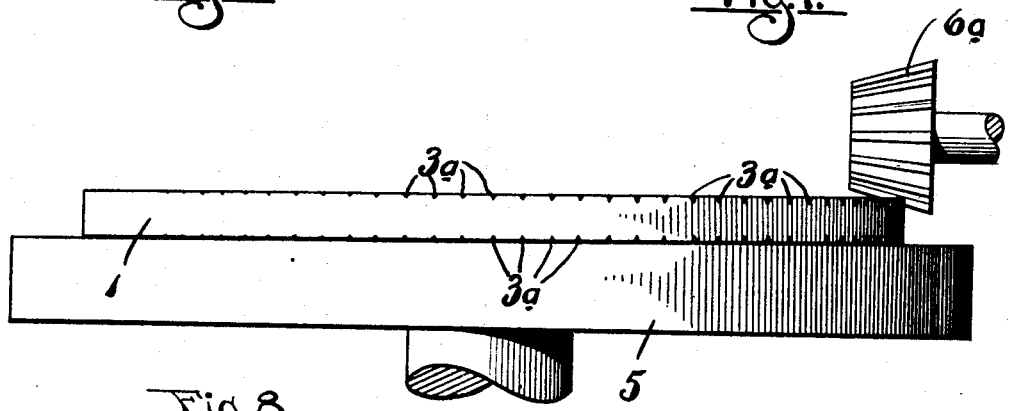
Fig. 8 is a view similar to Fig. 3 illustrating the mechanism for carrying out the process of indenting the ring at its opposite parallel flat sides and at the outer curved portion of the ring and extending inwardly therefrom, for the production of a contracting ring.

In Figs. 6 to 8 inclusive the process for producing the contracting ring is illustrated. The ring 1, shown in Fig. 6 has a parting 2 at one side but instead of being finished at its outer curved surface the scale may be left thereon while the ring is finished at its opposite flat parallel sides and at its inner curved surface. This ring, placed upon the anvil or table 5, is acted upon by an indenting rotatable tool 6a to provide the indentations in or is rolled at its opposite flat parallel sides leading from the outer side of the ring inwardly toward the inner side thereof but running out before reaching said inner side. In this case the axes about which the table 5 and the tool 6a rotate are at an angle to each other slightly less than a right angle for the provision of the deepest indentation directly opposite the parting with their progressive decrease in size toward the gap until they disappear, or this is also attained by the table or anvil being slightly higher on one side than on the other, the indentations 3a being in the opposite flat sides of the ring as shown in Fig. 7.

The ring thus made has its ends at the parting brought together and the ends pressed tightly against each other with considerable pressure in accordance with the amount of tension force which has been developed in the ring by the upsetting indentation or rolling process described; and if the two ends at the parting were sprung sideways apart from each other the same would pass by each other for a distance.

In the manufacture of rings in accordance with this process the finished surfaces of the rings are not disturbed, other than that the opposite flat sides of the ring are recessed by the indentations 3 or 3a, but the metal is not upset outwardly beyond the flat planes of the flat sides of the ring but an upset in all cases in the direction of the unfinished scale side of the ring.

The invention described is of a very practical nature permitting the production of piston rings with quantity production machinery and methods and with the provision in an expanding ring of as wide a gap as may be desired as illustrated at 4 in Fig. 2, and with comparatively light expense in the matter of production machinery for carrying out the process.

The invention is defined in the appended claims and is to be considered comprehensive of all forms of structure coming within their scope.

I claim:
1. The method of manufacturing a piston ring which consists in casting the ring, cutting the same at one place, machining its opposed flat sides to form substantially parallel finished surfaces, and then indenting one of the said parallel sides from one curved side thereof and toward its other curved side whereby small reservoirs are provided for the retention of oil, said indentations terminating short of said other curved side of the ring.

2. The process of completing a piston ring, which consists in machining the upper and lower faces thereof, then indenting both opposed flat sides thereof at a plurality of spaced apart points with the indentations of varying depth from one curved side of the ring toward but short of the other curved side of the ring whereby small reservoirs are provided for the retention of oil, the indentations having greatest size opposite the ring parting and progressively decreasing in size from each side thereof toward the ring parting.

3. The process of manufacturing a ring of the class described which consists in finishing the upper and lower surfaces thereof, revolving the ring about an axis slightly inclined with respect to a plane passing medially between the upper and lower surfaces of the ring, and indenting the ring during this wobbling movement whereby small reservoirs of a progressively varying depth are provided for the retention of oil.

CHARLES E. JOHNSON.